United States Patent
Pandey et al.

(10) Patent No.: US 9,078,043 B2
(45) Date of Patent: Jul. 7, 2015

(54) MEDIA SOURCE MONITORING AND PARENTAL AWARDS

(75) Inventors: Siddharth Pandey, Irving, TX (US); Michael Runne, Euless, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1701 days.

(21) Appl. No.: 12/184,698

(22) Filed: Aug. 1, 2008

(65) Prior Publication Data

US 2010/0031306 A1  Feb. 4, 2010

(51) Int. Cl.
| | |
|---|---|
| H04N 7/16 | (2011.01) |
| H04N 21/4784 | (2011.01) |
| H04N 7/173 | (2011.01) |
| H04N 21/475 | (2011.01) |

(52) U.S. Cl.
CPC ....... *H04N 21/4784* (2013.01); *H04N 7/17318* (2013.01); *H04N 21/4751* (2013.01); *H04N 21/4755* (2013.01)

(58) Field of Classification Search
CPC .................................................... H04N 21/454
USPC ....................................................... 725/11, 25
See application file for complete search history.

(56) References Cited

U.S. PATENT DOCUMENTS

| | | | |
|---|---|---|---|
| 4,566,033 A * | 1/1986 | Reidenouer | 725/7 |
| 7,073,189 B2 * | 7/2006 | McElhatten et al. | 725/58 |
| 8,312,484 B1 * | 11/2012 | McCarty et al. | 725/28 |
| 2003/0103627 A1 * | 6/2003 | Nierzwick et al. | 380/240 |
| 2004/0060059 A1 * | 3/2004 | Cohen | 725/30 |
| 2007/0028258 A1 * | 2/2007 | Wollmershauser et al. | 725/29 |
| 2009/0210909 A1 * | 8/2009 | Mukerji et al. | 725/51 |
| 2010/0050213 A1 * | 2/2010 | Bi et al. | 725/63 |

* cited by examiner

*Primary Examiner* — Nasser Goodarzi
*Assistant Examiner* — Michael Hong (57) ABSTRACT

A content processing device selectively queries at least one remote device in response to a message received from a user device. The message includes an instruction to modify information in at least one user data set stored on a remote device. Modifying information includes providing an award to one or more users associated with the one or more data sets.

27 Claims, 6 Drawing Sheets

MEDIA SOURCE MONITORING AND PARENTAL AWARDS

BACKGROUND INFORMATION

Media providers such as broadband, satellite, and/or cable companies may provide access to many media sources, such as television channels or the like. Users generally are able to control access to media channels through a content processing device such as a set top box (STB) or the like that allows users to select channels for viewing on a media player such as a television. Further, access to media channels may be governed at least in part by mechanisms such as user data sets that are downloaded to a content processing device when a particular user is identified. For example, a content processing device may transmit an identifier to a remote server to obtain a data set used to determine programming channels that may be made available through the content processing device. To take another example, a user such as a child may be required to enter a user identifier or the like using a remote control associated with a content processing device. This user identifier may be associated with a user data set that specifies particular media channels that the user may access, and/or times when the user may access these media channels. A user data set may also specify functions and settings available to a user, as well as, e.g., an amount of pay-per-view media a user may access. However, there are limitations in monitoring or controlling a user's access to media, e.g., monitoring or controlling operations such as may be desirable for a parent. For example, monitoring a channel that a user is presently viewing, changing the channel, updating functions or settings available to a user, or powering off a media player such as a television each generally requires direct access to the content processing device, e.g., using a remote control with direct line of sight to the media player or content processing device. Present mechanisms for remotely monitoring and/or controlling another user's media access are lacking.

DETAILED DESCRIPTION OF PREFERRED EMBODIMENTS

Figure 1:
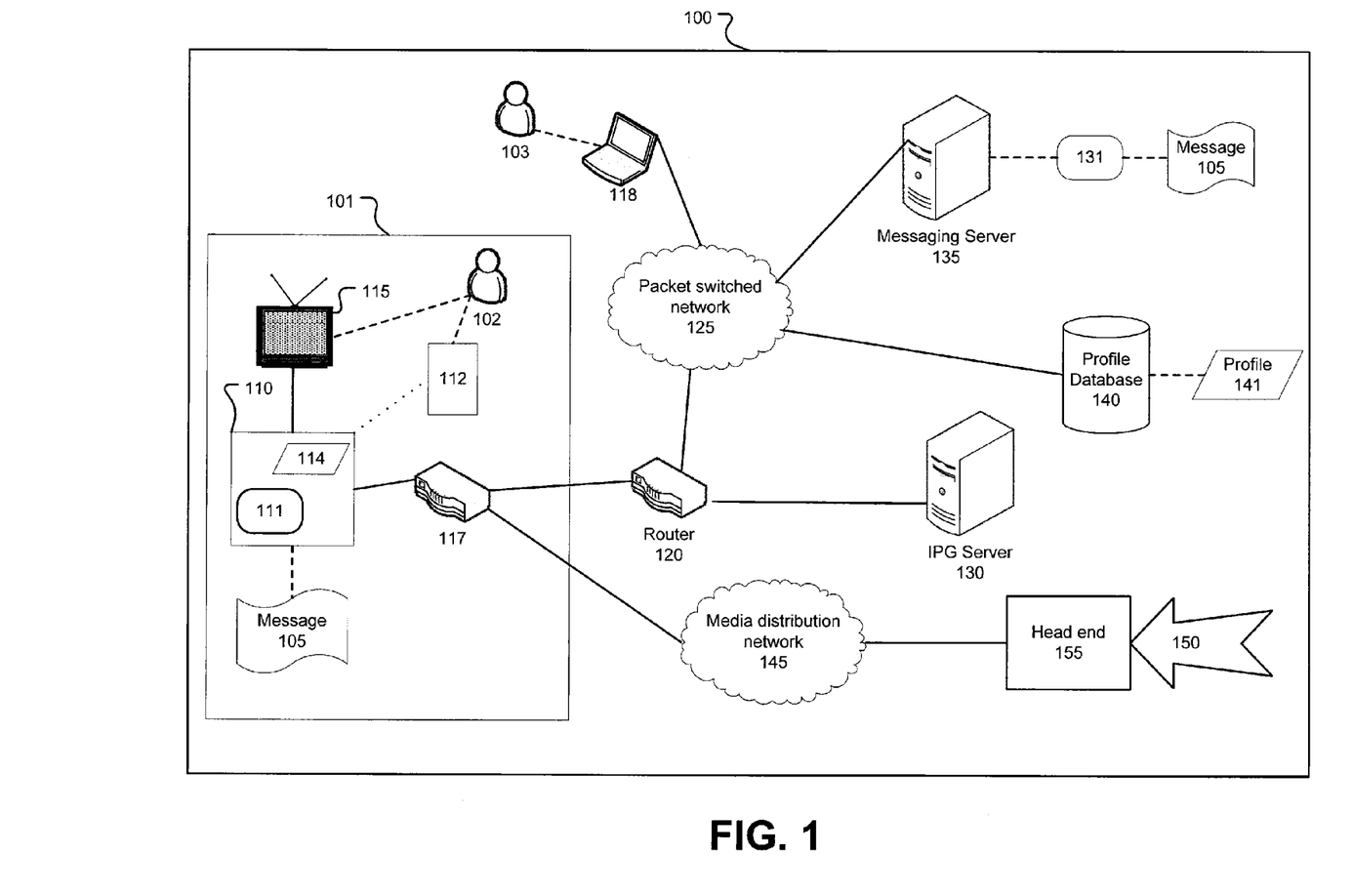
FIG. 1 illustrates an exemplary system for providing media content and for sending and receiving messages related to media content.

FIG. 1 illustrates an exemplary system 100 in which a user 102 within a customer premises 101 may access media content 150 through a content processing device 110. Media content 150, which is often received over a media distribution network 145 from a head end 155, may be displayed on media display device 115. User 102 may further send and receive messages 105 through the content processing device 110. Messages 105 may be communicated between content processing device 110 and one or more devices, such as a client 118 and/or an interactive program guide (IPG) server 130, a messaging server 135, a user database 140, etc. Client 118 is generally associated with an external user 103. Servers 130, 135, and user database 140, may communicate with content processing device 110 through a gateway router 120 and/or through a network such as a packet switched network 125. Messages 105 may include data referring to, or received from, a data store, such as a data set 141 stored within a user database 140.

Customer premises 101 may be a home, business, or any other location including a content processing device 110, and, as reflected in certain of the examples discussed below, may include multiple content processing devices 110, although only one content processing device 110 is shown in FIG. 1. One or more users 102 may access the one or more content processing devices 110.

Content processing device 110 generally is a specialized device, e.g., a set top box (STB) or similar device, for receiving media content 150 and for providing media content 150 to media display device 115. Content processing device 110 may include one or more user applications 111, discussed further below. Content processing device 110 generally includes a processor and a memory, and may be provided with a proprietary or specialized operating system. For example, content processing device 110 may be an STB provided with a real time operating system (RTOS) such as is known. However, content processing device 110 may be a computing device such as one of those enumerated below, so long as the computing device is capable of receiving media content 150 from network 145, and is capable of storing and executing the instructions included in a message 105. Content processing device 110 generally also includes, e.g., stored in a read only memory (ROM), a unique or substantially unique identifier 114 that identifies the content processing device 110. A user 102 may interact with content processing device 110, and/or user application 111, using a control 112, as discussed further below.

Content processing device 110 selectively communicates with various devices via a broadband home router (BHR) 117, including, further via a gateway router 120 and network 125, a client computer 118, which may be accessed by an external user 103. Content processing device 110 may further selectively communicate with IPG server 130, messaging proxy application 131, messaging server 135, user database 140, etc., via BHR 117, gateway router 120, and network 125. As shown in FIG. 1, user 103 may be outside of customer premises 101, and is therefore referred to as an "external" user. However, user 103 and client 118 could easily be located within premises 101, whether communicating with content processing device 110 through a mechanism within customer premises 101, e.g., BHR 117, a local area network, etc., or a mechanism external to customer premises 101, e.g., network 125. Content processing device 110 may also include one or more connections (not pictured), such as a Universal Serial Bus (USB) connection, a FireWire connection, or a wireless connection, such as an 802.11x (WiFi) or Bluetooth connection. One or more such connections may be configured to communicate with one or more peripheral devices, such as a memory store, an input device, etc.

Figure 3:
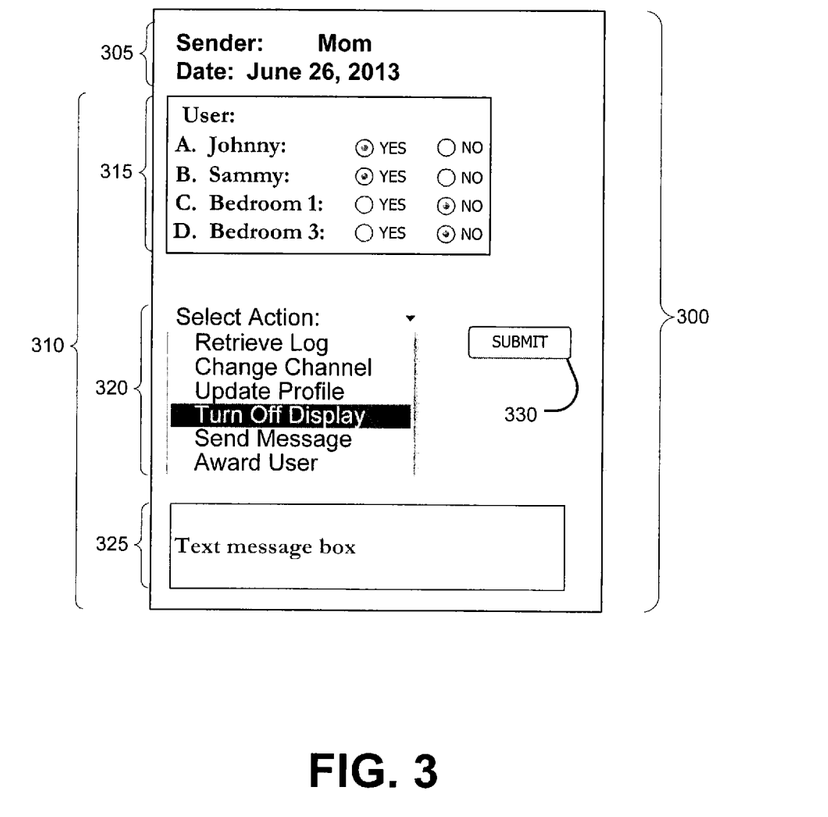
FIG. 3 illustrates an exemplary message.

User application 111 generally includes computer-executable instructions for providing various services such as messaging, parental controls, remote communications, data collection, etc. User application 111 may be stored in a nonvolatile memory of content processing device 110, e.g., a read-only memory (ROM). However, in some implementations content processing device 100 may have limited storage space, and therefore user application 111 may be downloaded, e.g., from server 130 or some other source, and stored in and executed from a volatile memory on an as-needed basis. User application 111 generally includes computer-executable instructions for providing a graphical user interface (GUI) to a user 102. Such a GUI generally provides the user 102 with the ability to provide input to, and view output from, user application 111. FIG. 3, discussed further below, illustrates an exemplary GUI 300 provided by user application 111 that allows a user 102 to configure a message 105. In general, the GUI may provide one mechanism for a user to interact with messaging server 135. A user may access the GUI using a control 112, described below, and may view the GUI using media display device 115, also described further below.

Control 112 is generally a remote control that can selectively communicate with content processing device 110 through wireless communications such as infrared (IR), radio frequency (RF) communications, etc. Control 112 may include numeric keys, arrow buttons, keys for specific functions, etc., and may also include alphanumeric keys. Control 112 may be a handheld remote control, or in some implementations may be a wired or wireless keyboard. A user 102 may utilize control 112 to select channels or other sources, e.g., a source that provides streaming digital media, via the World Wide Web or the like, of media content 150, access various menus and settings, make selections and requests, and input data, such as messages 105. Control 112 generally facilitates access to various to functions and menus provided by or through content processing device 110. Content processing device 110 and/or control 112 may also be used to control other devices, including media display device 115.

Media display device 115 receives media content 150 from content processing device 110, and plays such media content 150 so that it can be perceived by a user. Media display device 115 may also receive one or more control signals from content processing device 110, such as a signal to turn power on or off. Media display device 115 may be a television receiver, such as is known, including a television or a high definition television (HDTV). Media display device 115 may also be used to provide a user interface to certain functions and menus provided by content processing device 110. For example, a television may be used to display a graphical user interface to access various menus within an STB. Further, media display device 115 may be a computing device such as one of those enumerated below, so long as the computing device is capable of displaying media content 150. It is even possible that content processing device 110 and media display device 115 are included within a single computing device.

A message 105 may be initiated by content processing device 110 according to input from user a 102, or a message 105 may be initiated by a client 118 according to input from an external user 103. A response to a message 105 initiated by content processing device 110 may include an instruction for content processing device 110 to perform an action, such as modifying various settings within data set 141, which in turn may result in the modification of various settings in content processing device 110. Moreover, messages 105 may be initiated from various devices accessing network 125, such as IPG server 130, messaging proxy application 131, messaging server 135, user database 140, etc., discussed further below.

In general, messages 105 may be used to retrieve information, to modify settings within a content processing device 110, to modify data within a data store, e.g., to modify a data set 141, to provide information for display to a user 102 on a media display device 115, etc. For example, a user 102, such as a parent, may use a message 105 to retrieve information from a content processing device 110 regarding media content 150 accessing habits of another user 102, such as a child.

Similarly, such information may be retrieved by a user 103 through a client 118, e.g., by communicating with content processing device 110 or some other device accessible via network 125, e.g., user database 140, etc. Information concerning accessing habits may include a channel, a world-wide-web page, or other source of media content 150 that a user 102 is currently accessing, a log of recent or past channels, web pages, or other sources of media content 150 viewed by a user 102, a log of times at which user 102 viewed media content 150, the content processing device 110 through which user 102 accessed sources of media content 150, etc. Data concerning access of media content 150 by one or more users 102 may be included in a data set 141 that may be stored on a user database 140, as is explained in more detail below.

Further, a message 105 may be used to modify one or more settings within a data set 141 associated with one or more users 102. Similarly, a message 105 may be used to modify one or more settings within one or more content processing devices 110. Settings within a data set 141 will be described in more detail below. A user 102 or 103 may also use a message 105 to send a command to a device, such as content processing device 110. For example, a first user 102, such as a parent, accessing a first content processing device 110 may use a message 105 to send a command to a second content processing device 110 to change or block the source of media content 150 that a second user 102, such as a child, is currently accessing, to display a message intended for the second user 102 on media display device 115, or to power off media display device 115. A parent user 102 may also, e.g., use a message 105 to provide an award to a child user 102. For example, a parent user 102 may use a message 105, e.g., to allow, or unblock, a particular source of media content 150. For instance, a parent user 102 may modify one or more settings in a data set 141 to allow a child user 102 to access the internet through a content processing device 110, to access a particular user application 111 or client, such as an instant messaging client, to access gaming content over the content processing device 110, etc. Further, a parent user 102 may award a child user 102 with a certain number of pay-per-view (PPV) credits, which are described below, alter parental guidance settings within a data set 141, etc. A parent user 102 may also modify one or more settings to allow access to certain features or settings of a content processing device 110, such as allowing a child user 102 to use a USB or FireWire port, a Bluetooth connection, etc. Messages 105 may also be used to retrieve information from, e.g., IPG server 130, such as information related to one or more sources of media content 150.

Figure 2:
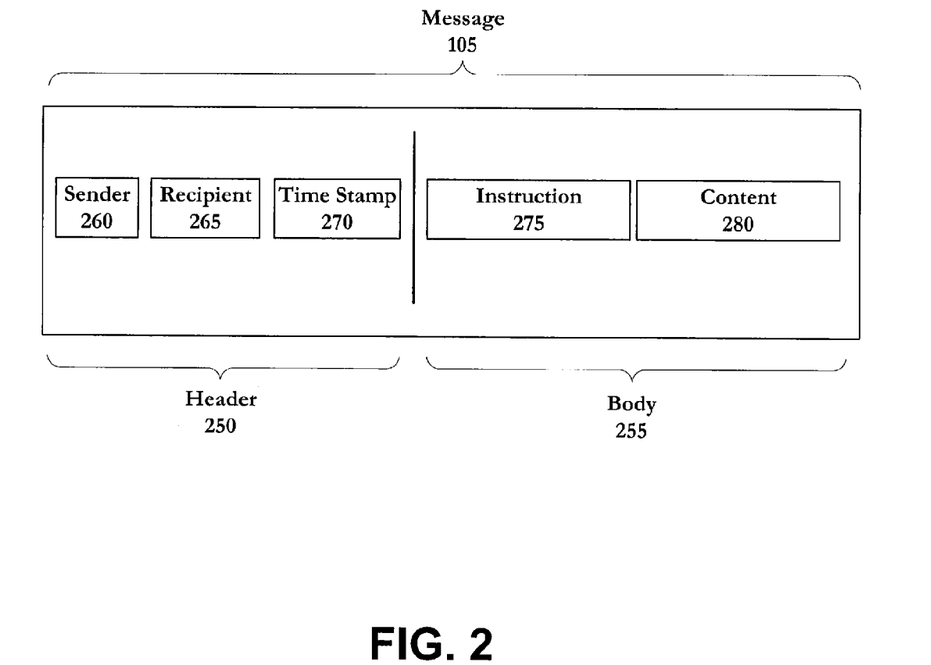
FIG. 2 illustrates an exemplary graphical user interface useful for creating a message.

At least some of the content of a message 105 may be based on manual input provided by a user 102 or 103, such as by using control 112. Messages 105 may also be generated in an automated or semi-automated fashion by a user 102 through one or more menus provided by an application 111 executing in content processing device 110. For example, user application 111 may include a messaging module having a GUI that a user 102 can access using control 112 and view using media display device 115. User 102 may supply input for message 105 using control 112 to interact with the GUI. The user 102 input may be text, and/or may include menu selections. In the latter case, when user 102 input includes one or more menu selections, user application 111 or content processing device 110 may then include content in a message 105 based on the input. FIG. 2, explained below, illustrates an exemplary message 105. FIG. 3, also explained below, illustrates an example form 300 which may be included in a GUI.

Referring now to FIG. 2, a diagram of an exemplary message 105 is illustrated. Message 105 generally includes a header 250 and a body 255. A header 250 may include several data items, including a sender identifier 260, a recipient identifier 265, and a time stamp 270.

The sender identifier 260 of the header 250 may include data identifying the sender of the message 105. This data may include an identifier associated with a particular user 102, 103, an identifier 114 for a content processing device 110, an identifier associated with a client 118, etc. An identifier may include an Internet Protocol (IP) address, or the like, which may generally be used to identify a device on a network. Similarly, the recipient identifier 265 of the header 250 may include data identifying an intended recipient of the message 105. The intended recipient may be a particular user 102, which user 102 may be identified through an associated identifier. The intended recipient may also be a particular content processing device 110, which may be identified, e.g., by an identifier 114, or may be a server such as IPG server 130, which may be identified, e.g., by an IP address. The time stamp 270 generally includes data identifying the time and/or date when the message 105 is created.

The message body 255 generally includes an instruction portion 275, and may include a content portion 280. Instruction portion 275 generally includes one or more commands for a recipient that is identified by recipient identifier 265 to execute upon receipt of message 105. For example, instruction portion 275 may instruct an IPG server 130 to transmit data related to media content 150 back to the sender identified by a sender identifier 260 of a message 105. In another example, instruction portion 275 may include a request from a content processing device 110 to retrieve data from a data set 141, on user database 140, associated with a particular user 102.

Content portion 280 may include additional data which may be used by the recipient identified by the recipient identifier 265 to carry out a command or fulfill a request identified in instruction portion 275. For example, instruction portion 275 may include a request to user database 140 to obtain a log related to a user 102, while content portion 280 may include query parameters such as, for example, information identifying the particular user 102, data which may be used to filter or narrow the information to be retrieved from the log according to one or more parameters, one or more text strings to be displayed to a recipient user 102, etc. In another example, instruction portion 275 may include a request to content processing device 110 to award a child with access to a source of media content 150, such as games or pay-per-view credit, explained below, while content portion 280 may include parameters such as, for example, information identifying particular games, a particular amount of game time, or an amount of pay-per-view credit to be awarded. In a further example, content portion 280 may include one or more additional commands, such as a command to provide a responsive message to the sender 260 of the message 105. It is possible that a message 105 includes both an instruction portion 275 and a content portion 280. It is also possible, however, that content portion 280 is simply omitted, and/or that any information which may generally be included in content portion 280 is included in instruction portion 275.

Data values for the header 250 and body 255 of message 105 may be retrieved, e.g., from a GUI included in a user application 111, an example of which is illustrated in FIG. 3.

Referring now to FIG. 3, an exemplary GUI including a form 300 for a message 105 is illustrated. Form 300 may include form items such as radio buttons, drop-down menus, check boxes, and the like to obtain information from user 102. The illustrated form 300 includes a header area 305 indicating the sender of the message 105 and the date on which the message 105 is sent. Form 300 also generally includes a body area 310. Body area 310 generally includes a recipient area 315 that may include radio buttons (as illustrated), check boxes, or some other mechanism for selecting perhaps one or one or more recipients of a message 105. Form 300 may further include an action area 320 that may include one or more selectable actions to be included in a message 105, and may further include a text box 325.

Recipient area 315 includes a list of potential message 105 recipients. This list may include one or more users 102 and one or more content processing devices 110. The name used to identify a particular user 102 or content processing device 110 in recipient area 315 may be configurable by a user 102, and may be stored, for instance, in data set 141. User 102 may choose one or more recipients included in recipient area 315, such as by selecting one or more radio buttons associated with users 102.

Action area 320 may include a drop-down menu or the like, from which a user 102 may select an action to be requested by message 105. A user 102 may select a particular action by, for example, selecting an action from included drop down menu.

Text box 325 may be selectively available, e.g., based on options chosen in the recipient area 315 and the action area 320 of form 300. For example, text box 325 may be available if user 102 selects "Award User," "Send Message," or "Change Channel" in action portion 320, but may be unavailable if user 102 selects, e.g., "Turn Off Display". User 102 may use text box 325, for example, to input additional information such as a text string to display to a recipient user 102, the particular channel or other source of media content to which a recipient content processing device 110 should change upon receipt of message 105, etc.

Form 300 generally includes a submit button 330. When a user 102 selects the submit button 330, e.g., via control 112, content processing device 110 may send message 105 to the appropriate recipient. For example, as illustrated in FIG. 3, when user 102 selects the submit button 330, content processing device 110 may send a message 105 to one or more other content processing devices 110 to power off the one or more media display devices 115 being accessed by the users 102 identified in recipient area 315. The one or more other content processing devices 110 may receive the message 105, and may take an action as indicated by the message 105, which generally correlates to the action listed in the action portion 320 of form 300.

When user 102 selects the submit button the message 105 may be generated. Message 105 may be generated, for example, by content processing device 110, user application 111, messaging proxy application 131, or messaging server 135. For instance, user application 111 may retrieve data for the sender identifier 260 and time stamp 270 of message 105 from header 205 of form 300. User application 111 may obtain data for the recipient area 265 of message 105 from recipient area 315 of form 300. Data for the instruction portion 270 of message 105 may be retrieved in part from action portion 320 of form 300, and data for content portion 280 of message 105 may be obtained from text box 325.

User application 111 may retrieve information from form 300 to generate message 105. User application 111 may also build message 105 by, in part, accessing one or more data stores, such as user database 140, which stores data sets 141.

When a message 105 is received by a recipient, the recipient may send a responsive message 105. A responsive message 105 may indicate, e.g., whether the command has been performed, information requested in the message 105, etc.

User application 111 may be configured to communicate messages 105. Messages 105 may be communicated directly between a content processing device 110 and a recipient, e.g., device 118 or the like. User application 111 may also be in selective communication with a messaging server 135.

Messaging server 135 is generally configured to facilitate transfers of messages 105 between various computing devices including content processing device 110, IPG Server 130, and user database 140. Messaging server 135 may be a standalone computing device that includes a processor and a memory, as well as a computer readable medium for storing data and/or computer-executable instructions for providing operations of the messaging server 135 such as those described herein. Messaging server 135 may also include other software, such as web server software for providing web pages and the like. Messaging server 135 may also be implemented in software running on IPG server 130, content processing device 110, client 118, or any other suitable computing device capable of communicating via network 125.

Messaging server 135 may utilize various hardware and software to facilitate transfers of messages 105. For example, messaging server 135 may utilize message transfer systems and protocols for message 105, such as session initiation protocol (SIP), SIP for instant messaging and presence leveraging extensions (SIMPLE), simple mail transfer protocol (SMTP), hypertext transfer protocol (HTTP), file transfer protocol (FTP), extensible markup language (XML), simple object access protocol (SOAP), and/or a proprietary format or protocol, etc.

Messaging server 135 may send and receive messages 105 formatted according to hypertext markup language (HTML), extensible markup language (XML), or the like. Messaging server 135 may also utilize various security schemes and encryption technologies to verify the integrity and/or authenticity of a message 105, and/or to obscure the information within message 105 from unintended recipients and eavesdroppers. Such technologies generally include public key infrastructure (PKI), digital signatures, digital certificates, secure shell (SSH), secure sockets layer (SSL), and transport layer security (TLS), to name but a few.

Various of the operations of the messaging server 135 may be performed by a messaging proxy application 131, which may be in selective communication with messaging server 135. Server 135 may be a physical computing machine including application 131, or application 131 and server 135 may be located on separate computing devices. Messaging proxy application 131 may support messaging operations associated with user application 111, including sending messages 105 to and from user application 111.

Messaging proxy application 131 may be useful when limited resources, e.g., limited memory and/or persistent storage, in content processing device 110 make hosting a complete messaging application 111 on content processing device 110 impractical or impossible. Accordingly, rather than persistently storing a messaging application 111 in content processing device 110, a messaging application 111 may be downloaded to content processing device 110 from messaging proxy application 131 or messaging server 135 when requested by a user 102.

Further, even if application 111 is stored persistently in content processing device 110, the user application 111 may access messaging proxy application 131 for performing certain operations. For example, operations such as signaling messaging server 135 to indicate a network presence, sending messages 105, receiving messages 105, etc. may be performed by messaging proxy application 131 on behalf of user application 111. Thus, although not necessarily the case, it is possible that user application 111 primarily serves to forward text strings and the like to messaging proxy application 131, along with limited header information indicating an intended recipient for a message 105.

User database 140 stores data sets 141. A data set 141 may be associated with one or more various entities, such as one or more users 102, one or more content processing devices 110, and/or a customer premise 101. Accordingly, data set 141 generally is associated in database 140 with at least one of a user 102 identifier, an identifier 114 for a content processing device 110, an identifier for a customer premises 101, etc. A data set 141 may be associated with multiple identifiers, e.g., identifiers for multiple users 102, multiple devices 110, and/or multiple customer premises, etc.

Data set 141 generally includes information identifying subscribed-for services via network 145, such as subscribed-for sources of media content 150. A data set 141 may also include personalization settings, media access restrictions, records of accessed media content 150, records of time spent accessing media content, etc. Data sets 141 may also include indicators related to pay-per-view (PPV) media content 150. For instance, a user 102 may have an allowance for a certain amount of PPV content. The allowance, or "pay-per-view credit," is generally numerical and may represent a particular dollar amount, or a number of credits. PPV credits may be purchased or otherwise acquired, such as by receiving an award of PPV credit from a parent. A portion of the PPV credit may be used to purchase PPV media content 150. PPV media content 150 may include, e.g., movies, concerts, games, etc. User database 140 is generally in communication with content processing device 110 and messaging server 135 via network 125. User database 140 may also be included, e.g., within messaging server 135.

Data set 141 may be used to impose restrictions on media content 150 that may be accessed through a content processing device 110. Content processing device 110 may require passcodes or the like in order to display some or all of the available sources of media content 150 from network 145. Such passcodes may be included in a data set 141. In fact, it is common to require a content processing device 110 to retrieve a data set 141 specifying media content 150, e.g., sources of media content 150, which may be provided via the content processing device 110, before media content 150 may be provided via the content processing device 110. Further, various schemes for restricting media content 150 through content processing device 110, which schemes may be selected or defined by a user 102, may also be enforced by using a data set 141. For example, a media restriction scheme may limit the times during a day when media content 150 will be accessible, sources of media content 150 that are accessible, or both. Content processing device 110 may, to take just one example among many, restrict the accessibility of media content 150 to two hours a day, regardless of what sources of, or when, media content 150 is accessed. Content processing device 110 may also, for example, restrict access to a particular network, such as the internet, or restrict access to one or more features or settings, such as internet access, instant messaging, or access to connections such as a USB or FireWire port, or a Bluetooth or WiFi connection.

User database 140 may provide information that causes content processing device 110 to modify various settings. For example, user database 140 may receive updated information concerning sources of media content 150 to be made available, possibly including dates and/or times when such sources are to be made available. Content processing device 110 may then receive an updated data set 141, and in turn, modify access to sources of media content 150. A data set 141, and therefore various changes, may apply to all content processing devices 110 that are associated with customer premises 101, to one particular content processing device 110, to a group of users 102, or to a particular user 102. User database 140 may be programmed to provide an updated data set 141 to content processing device 110, although content processing device 110 may query user database 140 periodically for updates, e.g., every ten minutes.

Where media content 150 or content processing device 110 settings are to be restricted according to the identity of a user 102, e.g., using a data set 141 in user database 140, content processing device 110 may require that a user 102 be authenticated before allowing access to media content 150. Authenticating a user 102 may involve the user 102 entering a user identification string, a username and password combination, a personal identification number (PIN), a password, etc., using control 112, or some other authentication method. As mentioned above, passcodes and other authentication information may be included in a data set 141. Accordingly, content processing device 110 may then query user database 140 for information from a data set 141, using protocols such as HTTP to communicate via network 125.

Accordingly, content processing device 110 may use data set 141 to provide the user 102 with various features, settings, and services tailored specifically for that user 102. Content processing device 110 may also monitor, store, and send data relating to the user 102 to user database 140 via network 125. Such information may include listings of accessed media content, dates and times of access, personalized channel lists, favorite TV programs, favorite world-wide-web pages, a PPV credit allowance, available settings on a content processing device 110, accounting data relating to the amount of time the user 102 spent accessing various media content 150, etc. The foregoing information may be used to update or modify data set 141. User database 140 may then store such information in a relational format, ensuring that such data is correctly associated with a particular user 102, group of users 102, content processing device 110, or customer premises 101.

Further, content processing device 110 may communicate with user database 140 to manage various user-specific functions and features, including parental control mechanisms. Parental control mechanisms may include the ability of a user 102, such as a parent, to update or modify a secondary data set 141, such as a data set 141 associated with another user 102, such as a child, or to modify one or more settings associated with a content processing device 110 or playback device 115 over which user 102, such as a child, may access media content 150. User database 140 may store parental control restrictions for a user 102 in a data set 141, and, using messaging server 135, prompt content processing device 110 to perform various actions by sending a message 105. For example, a parent may award a child with access to additional media content 150 sources, such as sources with a different parental rating, with more time to access a given media content 150 source, etc., by updating a data set 141 of a child by sending a message 105 to user database 140.

Updating a data set 141 using a message 105 may include modifying one or more settings within data set 141. For instance, a message 105 may include providing a data set 141 with instructions to block access to, or to restore access to, a particular source of media content 150. Additionally, or alternatively, message 105 may include instructions to edit "pay-per-view credits" within a user data set 141. That is, a user 102 may use a message 105 to provide pay-per-view credits to another user 102, thereby allowing user 102 to purchase pay-per-view media content 150. Further, a message 105 may include providing access to additional features or settings, such as access to a USB port through which a user 102 may, e.g., use another input device, such as a keyboard or a gaming controller.

IPG server 130 generally provides information related to available media content 150, and may also provide an interactive program guide to content processing device 110. Media content 150 information may include dates and times of television programs and movies, descriptions of particular content, channel information, PPV content information, such as descriptions and prices, and parental guidelines. Parental guidelines may include information about specific programs, movies, or about entire sources of media content, e.g., channels, such as ratings and/or descriptions. A user 102, such as a parent, may learn whether a particular program is appropriate for certain age groups through such parental guidelines. For example, a particular program may be indicated as inappropriate for children under the age of fourteen. Parental guidelines may also include information relating to specific examples of potentially offensive material including various examples of obscenity, indecency, and profanity. The Federal Communication Commission's (FCC) "TV Parental Guidelines," available from the FCC, e.g., at http://www.fcc.gov/parents/parentguide.html, are one such example of information that may be provided by IPG server 130 to content processing device 110.

IPG server 130 may provide an interactive program guide to content processing device 110 for display on media display device 115. An interactive program guide allows users 102 to obtain information and to select media content 150, generally by navigating and making selections using control 112. IPG server 130 generally includes a processor and a memory, as well as a computer readable medium such as a disk for storing data, e.g., interactive program guide data, to be provided to content processing device 110. A user 102 may use a message 105 to query IPG server 130, to obtain information, e.g., about particular television programs which another user 102 may be viewing, or may have viewed, on a media display device 115.

Content processing device 110, as stated previously, may selectively communicate with IPG server 130, messaging proxy application 131, messaging server 135, user database 140, etc., via BHR 117. BHR 117 may be one or more devices that are generally used for routing network traffic. BHR 117 facilitates data transfer over one or more networks, including packet switched network 125 and media distribution network 155.

BHR 117 is used for distributing audio, video, and data to devices within customer premises 101 such as content processing device 110. For example, BHR 117 may be a broadband home router or wireless broadband home router from Actiontec Electronics, Inc. of Sunnyvale, Calif. BHR 117 may also provide a wired or wireless local area network (LAN), thereby providing selective communications between various devices within customer premises 101. For example, a first content processing device 110 may utilize BHR 117 to communicate with a second content processing device 110 (not shown).

Content processing device 110 may use BHR 117 to send information to, and receive information from, a packet switched network 125. BHR 117 may access packet switched network 125 through a gateway router 120. IPG server 130, messaging server 135, and user database 140 may also selectively communicate with router 120, sometimes via network 125, but may also selectively communicate with BHR 117 via another network, such as media distribution network 145.

Gateway router 120 generally is used for routing data packets in packet switched network 125. Gateway router 120 allows content processing device 110 to access packet switched network 125. By communicating with router 120, content processing device 110 is able to obtain a network address such as an internet protocol (IP) address, thereby enabling content processing device 110 to send requests to, and to receive data from, servers such as messaging server 135.

Packet switched network 125 is generally an internet protocol (IP) network or the like. For example, network 125 uses protocols such as user datagram protocol (UDP), transmission control protocol (TCP), hypertext transfer protocol (HTTP), etc. Further, network 125 may include one or more of a variety of networks such as a wide area network (WAN), e.g., the internet, a local area network (LAN), etc.

Media distribution network 145 is a network for providing media content 150. For example, network 145 may include hardware and software for providing a video signal via a coaxial cable and/or a fiber optic cable. Media content 150 is generally provided to a media distribution network 145 from a head end 155.

Packet switched network 125 may be used to transport a variety of data, including multimedia data, such as audio and video. Accordingly, it is to be understood that it is possible that networks 125 and 145 are in fact combined into a single network, or that media distribution network 145 is simply omitted, whereby packet switched network 125 may be used to provide media content 150 to content processing device 110.

Computing devices such as content processing device 110, client 118, IPG server 130, messaging server 135, and similar devices may employ any of a number of known computer operating systems. For example, such devices may use any known versions and/or varieties of the Microsoft Windows operating system; the Unix operating system (e.g., the Solaris operating system distributed by Sun Microsystems of Menlo Park, Calif.); the AIX UNIX operating system distributed by International Business Machines of Armonk, N.Y.; and the Linux operating system. Computing devices may include any one of a number of computing devices, including, without limitation, a computer workstation, a desktop, notebook, laptop, handheld computer, or some other computing device.

Computing devices, such as those discussed herein, generally include instructions executable by a processor. Computer-executable instructions may be compiled or interpreted from computer programs created using a variety of programming languages and/or technologies known to those skilled in the art, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 4:
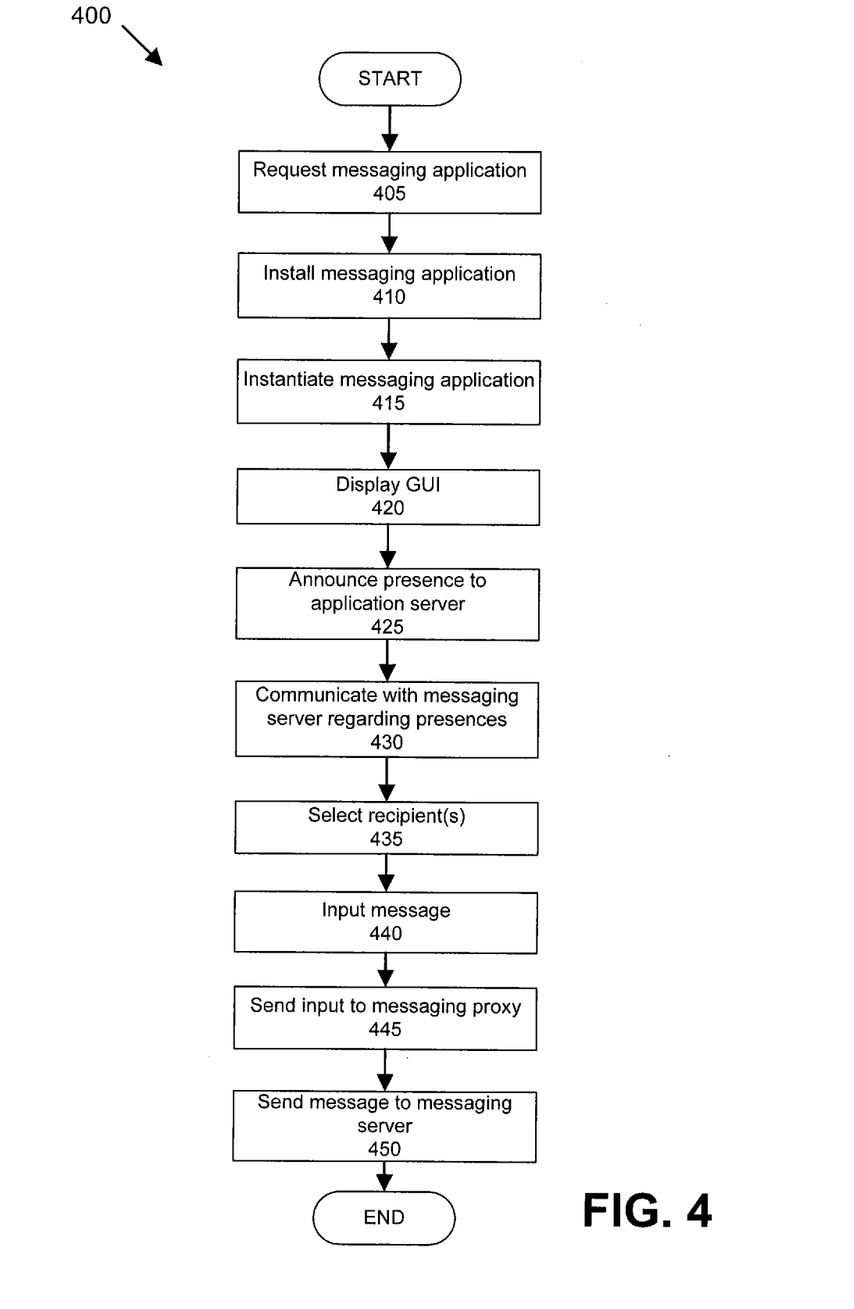
FIG. 4 illustrates an exemplary process of accessing a user application and sending a message.

FIG. 4 illustrates an exemplary process 400 of accessing a user application 111 and sending a message 105. In the exemplary process 400, various of the messaging functions are performed using a messaging proxy application 131, though it is understood that this is by way of example only, and that functions indicated as being performed by messaging proxy application 131 may be performed, e.g., by messaging server 135, user application 111, etc.

In step 405, user 102 seeks to access a messaging application, which may be included as part of user application 111. For example, user 102 could access user application 111 by selecting a menu option provided in a menu displayed by media display device 115, or user 102 could access user application 111 by using control 112 to specify a source of media content 150, where the source was associated with user application 111. In the case where a menu is provided, when the content processing device 110 is first powered on it generally initiates communications with a server, such as messaging server 135 and/or IPG server 130. At this time, various program instructions, including menus and the like, may be provided to content processing device 110. Such menus may be displayed once user 102 requests content processing device 110 to display media content 150. Such menus may include an option to access user application 111. Similarly, in step 405, a user 103 could access user application 111 using client 118.

Next, in step 410, content processing device 110, or client 118, communicates with messaging server 135 to request user application 111, whereupon user application 111 may be downloaded to content processing device 110 or client 118. This step 410 is unnecessary when user application 111 is persistently stored by content processing device 110 or client 118. However, as mentioned above, content processing device 110, or client 118, may have limited resources, in particular, limited memory and storage. Accordingly, to accommodate limitations on content processing device 110, or client 118, user application 111, or even particular components or modules of user application 111 necessary to satisfy a request by user 102 or 103, may be temporarily downloaded to content processing device 110, or client 118, from messaging server 135.

Next, in step 415, content processing device 110, or client 118, instantiates user application 111. Accordingly, user application 111 begins to execute within content processing device 110, or client 118.

Next, in step 420, having been instantiated in step 415, user application 111 causes a user interface, e.g., a graphical user interface (GUI) to be displayed by, e.g., media display device 115. The GUI displayed in step 420 may include conventional elements for a messaging client, such as an area to provide textual input for a message 105, a menu option to display a list of potential recipients for a message 105, menu options to display a list of potential commands to send to a recipient or information which may be requested regarding one or more recipients, a "send" button or the like, etc.

In step 425, user application 111 communicates with messaging server 135, for example, to announce its presence to messaging proxy application 131, e.g., via SIP or the like. Generally, user application 111 provides an identifier associated with user 102 or 103 to messaging proxy application 131. In some cases, this identifier may simply be an identifier stored in and associated with content processing device 110 or client 118. However, a user 102 or 103 may be prompted to input a username and/or password, e.g., when accessing user application 111 as described above with respect to step 405. In such event, a user 102 or 103 may be validated by messaging proxy application 131, and, although not illustrated in FIG. 3, process 400 may terminate if validation is not successful. Although step 425 is shown in FIG. 4 as occurring after step 420, it is to be understood that step 425 may be executed prior to or simultaneously with step 420.

Following step 425, in step 430, messaging proxy application 131 may provide a list of potential recipients of message 105 to user application 111. The list of potential recipients may be provided to user 102 or 103, e.g., in a recipient area 315 of a form 300 as described above with respect to step 420. The list of potential recipients may include a list of individual users 102 or content processing devices 110, groups of users 102 or content processing devices 110, etc., which may be associated with the user 102 or 103 accessing the user application 111. For instance, messaging proxy application 131 may obtain a list of child users 102 associated with a parent user 102, 103. Messaging proxy server 131 may obtain this list by, for example, accessing a data set 141 associated with user 102 on user database 140.

Next, in step 435, user 102 or 103 identifies one or more recipients for a message 105. The recipients may be selected from a list, or the like, stored in content processing device 110 or client 118 or provided from messaging server 135, e.g., downloaded as described above in step 410.

Next, in step 440, user 102 or 103 provides input, generally using control 112, to provide content or instructions for a message 105. This input may include strings of text, a format well-suited to situations in which content processing device 110 or client 118 has limited processing power and/or memory, or where the amount of bandwidth that is consumed by a message 105 is a concern. Text may be input directly by user 102, 103. Alternatively, a text string may be created by user application 111 based on user 102, 103 input in one or more menus or GUIs, such as those described above. Instructions included in a message 105 may include a request for particular information associated with one or more users 102 or content processing devices 110, or commands or notifications to be sent to one or more users 102 or content processing devices 110. For example, a parent user 103 of client 118 may request information regarding media content 150 currently provided to a content processing device 110 and displayed on media display device 115 to a child user 102. User 102 or 103 may, additionally or alternatively, send a command to change the source of media content 150 currently accessed by a content processing device 110 used by a child user 102.

Step 440 may be complete when a user 102 or 103 selects a "send" button, presses a special key on control 112, etc. Following step 440, in step 445, the input provided in step 440 is sent to messaging proxy application 131. Steps described herein could be carried out in an order other than set forth herein, and in particular steps 435, 440, and 445 could be executed in an order other than that illustrated in FIG. 4.

Next, in step 450, messaging proxy application 131 creates message 105 based on the input provided from user application 111. As mentioned above, in step 440, messaging proxy application 131 receives an identifier or identifiers for one or more recipients for message 105, along with input providing content for the message 105. As discussed above, message 105 may include other elements besides information identifying a recipient, and actual message content. For example, message 105 may include a header 250 including an identifier for the sender, e.g., user 102 or 103, content processing device 110, or client 118, as well as a date or timestamp, network addresses associated with recipients, etc. As mentioned above, content processing device 110 or client 118 may have limited resources to provide to user application 111. Accordingly, in step 445, messaging proxy application 131 may utilize the less limited resources of messaging server 135 to perform certain operations associated with the creation and sending of message 105. However, it is possible for user application 111 to perform operations attributed herein to messaging proxy application 131, and therefore it is possible for message 105 to be sent to messaging server 135 directly from content processing device 110 or client 118. Further, it is possible for a user application 111 on a content processing device 110 to send a message 105 to another user application 111 or content processing device 110 without accessing messaging server 135, such as by sending message 105 directly to another content processing device 110, or through a common BHR 117.

Certain of the steps in process 400 described above could be performed simultaneously or nearly simultaneously. For example, a user 102 or 103 could provide input received by user application 111 as described above with respect to step 440, while at more or less the same time messaging proxy application 131 sends previously received input to messaging server 135, as described above with respect to step 445. Accordingly, certain steps, e.g., steps 335, 340, 345, could be repeated, or could be executed in a loop, although such is not illustrated in FIG. 4.

In some cases, once user application 111 has been instantiated, a user 102 may access media content 150 through content processing device 110, e.g., may view video sources, e.g., a television channel, or the like. In such embodiments, user application 111 may provide a GUI alongside or over the display of media content 150 for inputting message 105 content, and for allowing a user 102 to send such content, along with recipient identifiers as appropriate, to messaging proxy application 131. Accordingly, some or all of process 400 may occur at the same time the content processing device 110, or client 118, is performing other operations, such as displaying media content 150 such as video.

Following step 450, process 400 ends.

Figure 5:
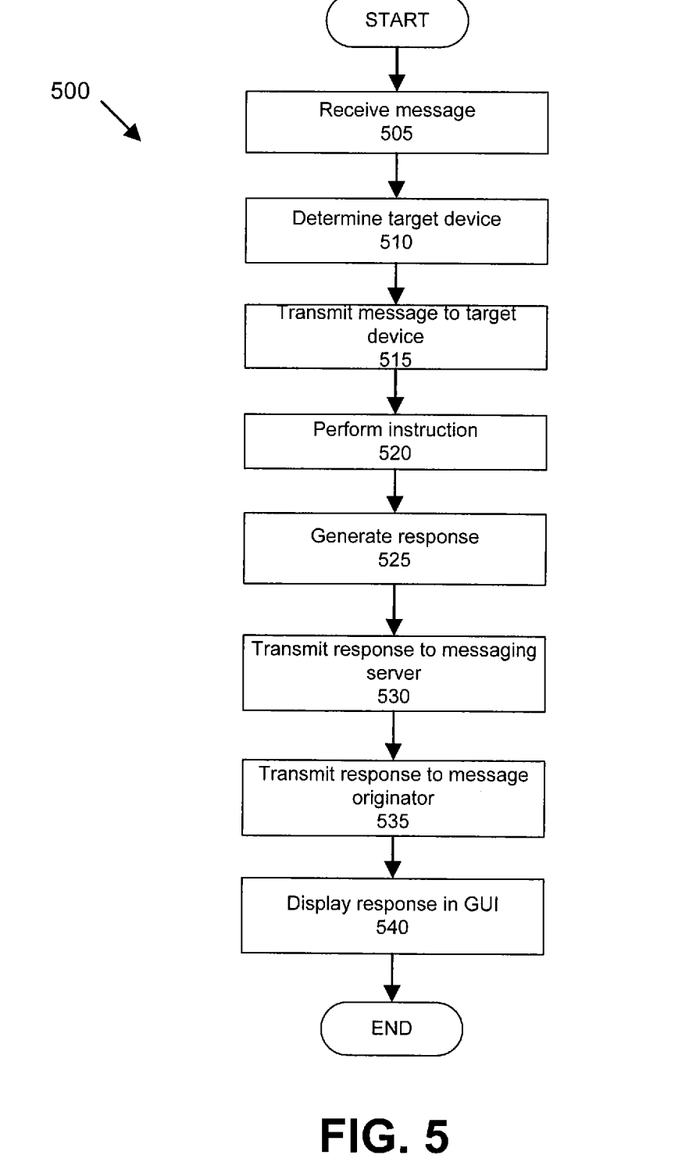
FIG. 5 illustrates an exemplary process for accessing a user application and receiving a message.

FIG. 5 illustrates a process 500 for executing commands received via a message 105. Message 105 may be received according to process 400 of FIG. 4. Instructions may be received by a content processing device 110, client 118, IPG server 130, messaging server 135, user database 140, or other device.

Next, at step 505, a message 105 is received. Message 105 may be received, e.g., by messaging server 135 or messaging proxy application 131.

Next, at step 510, the received message 105 may be parsed. The message 105 may be parsed into portions, including a recipient area 260 indicating an intended recipient, and an instruction portion 270 indicating a command. A recipient may be, for instance, a content processing device 110, a user database 140, or a particular data set 141.

Next, at step 515, the message 105 may be transmitted to the intended recipient by messaging server 135 or messaging proxy application 131.

Next, at step 520, the recipient device may receive the message 105 and perform the included command. For example, a user database 140 may receive a command and provide information related to one or more users 102, or user data sets 141, as discussed above. Further, a user database 140 may receive a command and update one or more parameters in a data set 141, as also discussed above. When the intended recipient is a content processing device 110, the content processing device 110 may respond by providing information related to the current status of the content processing device 110, for example, the source to which the content processing device 110 is currently tuned, or the user 102 currently accessing the content processing device 110. Further, depending on the instruction included in message 105, content processing device 110 may change the source to which content processing device 110 is tuned, may transmit a signal to shut off power to media display device 115, may provide a message to one or more users 102, etc.

Next, at step 525, a responsive message 105 may be generated, though this step may be omitted. A responsive message 105 may be generated by the recipient device and may include information requested as part of message 105, may include an indicator as to whether a requested task was performed successfully, etc. The responsive message 105 may be formatted in a manner similar to message 105, wherein the intended recipient is the sender of message 105.

Next, at step 530, if a responsive message 105 has been generated in step 525, the generated responsive message 105 may be transmitted to messaging server 135. Alternatively, the generated responsive message 105 may be transmitted to messaging proxy application 131, or directly to an intended recipient.

Next, at step 535, if a responsive message 105 has been generated in step 525, the responsive message 105 is sent, e.g., from messaging server 135 to the originator of message 105, such as content processing device 110, client 118, or a user 102 or 103.

Next, at step 540, the transmitted responsive message 105, a portion thereof, or information generated in response to the transmitted responsive message 105, may be presented to a user 102, such as over media display device 115 through content processing device 110.

Following step 540, the process 500 ends. It is to be understood that certain of the steps of process 500 may be performed in an order other than that listed and that certain steps may be omitted.

Figure 6:
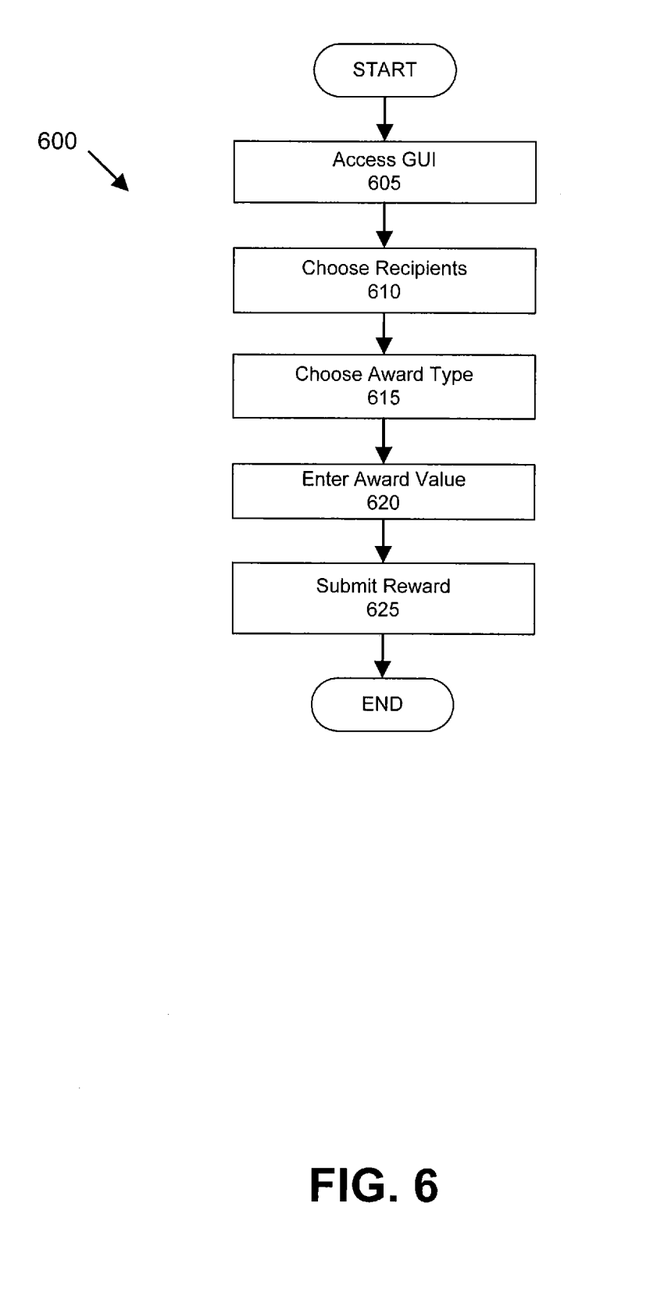
FIG. 6 illustrates an exemplary process for providing an award to a user using a message.

FIG. 6 illustrates a process 600 for generating an award for a user 102, such as a child, using a GUI such as is illustrated in FIG. 3.

At step 605 a user 102 accesses the GUI, e.g., via content processing device 110. A user 103 may also access a GUI, e.g., via client 118. Further, the GUI may generally be accessed through a user application 111.

Next, at step 610, the user 102 chooses one or more recipients of an award. Recipients may be chosen, for example, from a list of possible recipients in a recipient area 315, e.g., by choosing one or more radio buttons associated with one or more users 102.

At step 615, user 102 chooses an award type. For instance, user 102 may choose to add PPV credits to a user data set 141 associated with a user 102, to add channels of media content 150 available to a user 102, to make features available to a user 102, etc. User 102 may choose an award type using a variety of mechanisms, e.g., from a drop down list which may be included in an action portion 320 of a form 300 in a GUI.

At step 620, user 102 enters an award value. The award value may be entered, for example, in text box 325 of form 300. The award value may include, for example, the amount of PPV credit to add to a particular data set 141, particular sources of media content 150 to make available to a user 102, features to make available to user 102, etc. Media content sources 150 may include particular channels of media content 150, or particular types of media content 150, such as internet access, game content, video on demand programming, media content 150 of a particular parental level, etc. Features may include, e.g., instant messaging, access to USB or FireWire ports, etc.

At step 625, when a user 102 selects the submit button 330, e.g., via control 112, content processing device 110 may send message 105 to the appropriate recipient. For example, when user 102 selects the submit button 330, content processing device may send a message 105 to one or more data sets 141 in a user database 140 associated with one or more users 102, such as users 102 chosen above in step 610. Once a user 102 selects the submit button, user application 111 may build the message 105, and transmit the message 105 to an appropriate recipient, e.g., as described above.

Process 600 ends after the user selects the submit button 330 in step 625.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A content processing device including a tangible computer readable medium and a processor, the computer readable medium having instructions stored thereon that are executable by the processor, including instructions to:
   receive a message from a user control device, the message including a textual input and having an instruction portion and a content portion, the instruction portion of the message including a first command to modify information in one or more data sets stored on at least one remote device based on information stored in the content portion by providing an award to one or more users associated with the one or more data sets;
send a query to the at least one remote device in response to the message received from the user control device; and
retrieve the modified information from the one or more user data sets in accordance with the textual input and a second command in the instruction portion of the message.

2. The content processing device of claim 1, wherein the award includes at least one of modifying restrictions associated with a user data set, modifying a list of media content available in a data set, allowing access to one or more sources of media content, and allowing access to one or more features of a content processing device.

3. The content processing device of claim 1, wherein the award includes adding one or more pay-per-view credits to each of one or more user data sets, whereby the one or more pay-per-view credits may be used to purchase pay per view media content.

4. The content processing device of claim 1, wherein the second command to retrieve the modified information is received while the media content is being accessed and based at least in part on information stored in the content portion.

5. The content processing device of claim 1, wherein the at least one remote device is at least one of a set top box, a messaging server, and a user database.

6. The content processing device of claim 1, wherein each of the one or more user data sets includes at least one of an identifier for a content processing device, an identifier for a user, and an identifier for a customer premise.

7. The content processing device of claim 2, wherein modifying restrictions associated with a user data set includes at least one of modifying times at which a user associated with the data set can access media content, updating a parental control restriction associated with the data set, unblocking at least one source of media content, and modifying sources of media content available to a user associated with the data set.

8. The content processing device of claim 2, wherein allowing access to one or more sources of media content includes allowing access to at least one of an instant messaging application, a game application, and the internet.

9. The content processing device of claim 2, wherein allowing access to one or more features of a content processing device includes at least one of allowing access to one or more connections included in the content processing device, and allowing access to one or more user applications.

10. The content processing device of claim 9, wherein the one or more connections included in the content processing device includes at least one of a USB connection, a FireWire connection, a Bluetooth connection, and a WiFi connection.

11. The content processing device of claim 3, wherein pay per view media content includes at least one of a computer application, video, audio and a web page.

12. A method comprising:
receiving a message, in a content processing device, from a user control device, the message including a textual input and having an instruction portion and a content portion, the instruction portion including a first instruction to modify information in at least one of one or more user data sets stored on at least one remote device based on information stored in the content portion;
querying the at least one remote device for the information in the at least one user data set;
modifying the information stored in the at least one user data set according to the instruction portion and content portion of the received message at least by providing an award to one or more users associated with the at least one data set; and
retrieving, in response to a second instruction in the instruction portion of the message, the modified information from the one or more user data sets.

13. The method of claim 12, wherein the award includes at least one of modifying restrictions associated with a user data set, modifying a list of media content available in a data set, allowing access to one or more sources of media content, and allowing access to one or more features of a content processing device.

14. The method of claim 12, wherein modifying the information stored in the at least one user data set by providing an award includes adding one or more pay-per-view credits to each of one or more user data sets, whereby the one or more pay-per-view credits may be used to purchase pay-per-view media content.

15. The method of claim 12, wherein the modified information is received while the media content is being accessed and based at least in part on the content portion of the message.

16. The method of claim 12, wherein each of the one or more user data sets includes at least one of an identifier for a content processing device, an identifier for a user, and an identifier for a customer premise.

17. The method of claim 12, wherein the at least one remote device includes one or more of a content processing device, a user database, a messaging server and an interactive programming guide server.

18. The method of claim 12, further comprising blocking a media content source in real time based on information associated with media content currently being accessed and stored in at least one of the instruction portion and content portion of the message.

19. The method of claim 12, further comprising powering off the content processing device in real time based on information associated with media content currently being accessed and stored in at least one of the instruction portion and content portion of the message.

20. The method of claim 13, wherein allowing access to one or more sources of media content includes allowing access to at least one of an instant messaging application, a game application, and the internet.

21. The method of claim 13, wherein modifying restrictions associated with a user data set includes at least one of modifying times at which a user associated with the data set can access media content, updating a parental control restriction associated with the data set, unblocking at least one source of media content, and modifying sources of media content available to a user associated with the data set.

22. The method of claim 13, wherein allowing access to one or more features of a content processing device includes at least one of allowing access to one or more connections included in the content processing device and allowing access to one or more user applications.

23. The method of claim 14, wherein pay per view media content includes at least of a computer application, video, audio, and a web page.

24. A system, comprising:
a server configured to receive a query, to retrieve information stored in one or more user data sets in response to the received query, and to transmit the retrieved information; and
a content processing device configured to selectively receive a message from a user control device, and to selectively query the server in response to the message received from the user control device;

wherein the message includes a textual input and has an instruction portion and a content portion, wherein the instruction portion includes a first instruction to modify or add information in at least one of one or more user data sets based on information stored in the content portion and a second instruction to retrieve the modified information from the one or more user data sets, wherein the one or more user data sets are accessible to the server and each including at least one of an identifier of one or more media content sources accessible by a user, one or more times at which the user may access media content, an amount of time a user may spend accessing a particular set of media content, and pay per view credits available to a user.

25. The system of claim 24, wherein the server is in selective communication with a user database, and the one or more user data sets are stored on the user database.

26. The system of claim 24, wherein the instruction portion of the message includes a plurality of commands, wherein at least one of the plurality of commands is received while the media content is being accessed and instructs the content processing device to block the media content source in real time.

27. The system of claim 24, wherein the instruction portion of the message includes a plurality of commands, wherein at least one of the plurality of commands is received while the media content is being accessed and instructs the content processing device to power off in real time.

\* \* \* \* \*